(12) United States Patent
Cheng

(10) Patent No.: US 10,859,240 B2
(45) Date of Patent: Dec. 8, 2020

(54) MINI LIGHT EMITTING DIODE BACKLIGHT MODULE AND MANUFACTURING METHOD OF FLUORESCENT FILM LAYER

(71) Applicant: Wuhan China Star Optoelectronics Technology Co., Ltd., Hubei (CN)

(72) Inventor: Yan Cheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 376 days.

(21) Appl. No.: 16/069,303

(22) PCT Filed: Apr. 24, 2018

(86) PCT No.: PCT/CN2018/084179
§ 371 (c)(1),
(2) Date: Jul. 11, 2018

(87) PCT Pub. No.: WO2019/184036
PCT Pub. Date: Oct. 3, 2019

(65) Prior Publication Data
US 2020/0355348 A1    Nov. 12, 2020

(30) Foreign Application Priority Data

Mar. 28, 2018  (CN) .......................... 2018 1 0265118

(51) Int. Cl.
*F21V 9/32* (2018.01)
*F21V 17/10* (2006.01)
(Continued)

(52) U.S. Cl.
CPC .................. *F21V 9/32* (2018.02); *F21K 9/64* (2016.08); *F21V 3/00* (2013.01); *F21V 17/10* (2013.01); *F21Y 2115/10* (2016.08)

(58) Field of Classification Search
CPC ............. F21V 9/32; F21Y 2105/10–18; G02F 1/13306; G02F 2001/133607; F21K 9/64
See application file for complete search history.

(56) References Cited

U.S. PATENT DOCUMENTS

| 2002/0017857 A1 | 2/2002 | Hashimoto et al. |
| 2005/0174038 A1* | 8/2005 | Lee .......................... H01J 63/06 313/495 |

(Continued)

FOREIGN PATENT DOCUMENTS

| CN | 101649975 | 2/2010 |
| CN | 201621532 | 11/2010 |

(Continued)

*Primary Examiner* — Rajarshi Chakraborty
*Assistant Examiner* — Michael Chiang
(74) *Attorney, Agent, or Firm* — Leong C. Lei

(57) ABSTRACT

Disclosed is a mini light emitting diode backlight module, comprising a light emitting diode light source and a fluorescent film layer, wherein the light emitting diode light source comprises a substrate and mini light emitting diode lamp beads arranged in an array on the substrate, and the fluorescent film layer is disposed in a light emitting direction of the light emitting diode light source, and a surface of the fluorescent film layer toward the mini light emitting diode lamp beads is provided with grooves arranged in an array. By designing the fluorescent film layer having a specific shape, and placing the same in front of the mini light emitting diode lamp beads, the light leakage can be avoided and the light path can be changed to solve the problem of hotspot and light leakage around in the mini light emitting diode backlight module.

16 Claims, 3 Drawing Sheets

(51) Int. Cl.
*F21V 3/00* (2015.01)
*F21K 9/64* (2016.01)
*F21Y 115/10* (2016.01)

(56) References Cited

U.S. PATENT DOCUMENTS

| | | | |
|---|---|---|---|
| 2010/0123855 A1* | 5/2010 | Shin | F21V 9/30 |
| | | | 349/61 |
| 2012/0153311 A1* | 6/2012 | Yuan | F21K 9/90 |
| | | | 257/88 |
| 2013/0187540 A1* | 7/2013 | Tischler | H01L 33/501 |
| | | | 313/512 |
| 2015/0241004 A1* | 8/2015 | Oberschmid | F21K 9/60 |
| | | | 362/84 |
| 2015/0338065 A1* | 11/2015 | Wang | F21V 29/70 |
| | | | 362/97.1 |
| 2015/0354760 A1* | 12/2015 | Sun | F21V 9/32 |
| | | | 362/84 |

FOREIGN PATENT DOCUMENTS

| | | |
|---|---|---|
| CN | 201757335 | 3/2011 |
| CN | 202101059 U | 1/2012 |
| CN | 102565921 | 7/2012 |
| CN | 102829392 A | 12/2012 |
| CN | 103244872 | 8/2013 |
| CN | 203273509 U | 11/2013 |
| CN | 103676315 A | 3/2014 |
| CN | 104006334 A | 8/2014 |
| CN | 105259700 | 1/2016 |
| CN | 106226949 | 12/2016 |
| CN | 107092051 | 8/2017 |
| CN | 206411377 | 8/2017 |
| CN | 206450928 U | 8/2017 |
| CN | 107403861 | 11/2017 |
| CN | 107422529 A | 12/2017 |
| CN | 206863415 | 1/2018 |
| CN | 107784968 A | 3/2018 |

* cited by examiner

MINI LIGHT EMITTING DIODE BACKLIGHT MODULE AND MANUFACTURING METHOD OF FLUORESCENT FILM LAYER

RELATED APPLICATIONS

The present application is a National Phase of International Application Number PCT/CN2018/084179, filed Apr. 24, 2018, and claims the priority of China Application No. 201810265118.5, filed Mar. 28, 2018.

FIELD OF THE INVENTION

The present invention relates to a display technical field, and more particularly to a mini light emitting diode backlight module and a manufacturing method of a fluorescent film layer.

BACKGROUND OF THE INVENTION

The mini light emitting diode (LED) reduces the volume of the direct type LED backlight module so that the panel color is very good and the contrast is very high. Mini LED and micro LED are completely different processes and completely different technologies. The mini LED is placed in a backlight module, which may only require 7,000 pieces. However, the micro LED is the monitor and is directly configured on the pixel, which may be up to 6 million pieces. Thus, the yield rate becomes significantly important, and the application of micro LED will be an extremely huge challenge. The mini LED changes the side type backlight sources having dozens of LED lamps into the direct backlight sources having thousands, tens of thousands and even more LED lamps. The HDR precision reaches unprecedented levels. It is not required to perform the OLED theoretical values adjustment pixel-by-pixel, but at least sufficient to meet the extreme needs of adjustment range for future HDR image signals. In addition, LCD panels with mini LED backlight design have better chromaticity, but the thickness can be the same as OLED.

Although a single mini LED is smaller in size, it can achieve a high dynamic range (HDR) screen effect with a local dimming design to achieve a more detailed screen image, not only with the same thickness as OLED and better color rendering than OLED due to the direct type backlight.

The mini LED technology has acted an important role in the realization of high dynamic range image sensors and full screen. However, as realizing full screen of this technology, the problems, such as light leakage (hotspot) and light leakage around are difficult to solve. Moreover, the frame of the small-sized module is required to be narrower and narrower, and the thickness is required to be thinner and thinner. The mini LED can neither be surrounded by a blocking wall to prevent light leakage, nor can increase lens to change the light type to solve hotspot as a large-sized module does, resulting in more difficult to solve the problems of hotspot and light leakage around in the small-size modules to cause obstacles for the mini LED application.

SUMMARY OF THE INVENTION

In view of the insufficiency of existing technologies, the present invention provides a mini light emitting diode backlight module and a manufacturing method of a fluorescent film layer, which can effectively solve the problem of hotspot and light leakage around in the mini light emitting diode backlight module, and are simple and easy to reduce the production cost.

For realizing the aforesaid objective, the present invention provides the following technical solutions:

a mini light emitting diode backlight module, comprising a light emitting diode light source and a fluorescent film layer, wherein the light emitting diode light source comprises a substrate and mini light emitting diode lamp beads arranged in an array on the substrate, and the fluorescent film layer is disposed in a light emitting direction of the light emitting diode light source, and a surface of the fluorescent film layer toward the mini light emitting diode lamp beads is provided with grooves arranged in an array.

As one of the embodiments, a number of the grooves is not less than a number of the mini light emitting diode lamp beads, and each of the mini light emitting diode lamp beads is directly opposite to at least one of the grooves.

As one of the embodiments, a radial dimension of the groove is not less than a radial dimension of the mini light emitting diode lamp bead, which is directly opposite thereto, and each of the mini light emitting diode bead faces one of the grooves.

Alternatively, the radial dimension of the groove is less than the radial dimension of the mini light emitting diode lamp bead, which is directly opposite thereto, and each of the mini light emitting diode bead faces a plurality of grooves.

As one of the embodiments, a bottom surface of the groove is a concave arc surface.

As one of the embodiments, the fluorescent film layer further comprises convex pillars arranged along edges of the fluorescent film layer in a circle at intervals, and the convex pillars and the grooves are respectively disposed on two opposite surfaces of the fluorescent film layer.

As one of the embodiments, the mini light emitting diode backlight module further comprises a diffusion film, wherein edges of a bottom surface of the diffusion film are attached to surfaces of the convex pillars.

As one of the embodiments, the mini light emitting diode backlight module further comprises a light shielding adhesive, wherein the light shielding adhesive is adhered on edges of a top surface of the diffusion film, and is extended to be adhered to lateral sides of the convex pillars and a bottom surface of the substrate.

Another objective of the present invention is to provide a manufacturing method of a fluorescent film layer, comprising:

coating a fluorescent material in a mold, wherein the mold comprises a cavity surrounded by a bottom wall and a sidewall, and the bottom wall is provided with a plurality of protrusions arranged in an array;

placing the fluorescent material with the mold into a curing cavity to age and shape the fluorescent material;

peeling the shaped fluorescent material from the mold to obtain the fluorescent film layer with a surface having grooves arranged in an array.

As one of the embodiments, the mold further comprises cylinder portions in a circle disposed at an outer edge of the bottom wall, and the fluorescent material is also filled in the cylinder portions as coating the fluorescent material in the mold.

By designing the fluorescent film layer having a specific shape, and placing the same in front of the mini light emitting diode lamp beads, the light leakage can be avoided and the light path can be changed to solve the problem of hotspot and light leakage around in the mini light emitting diode backlight module. The method is simple and easy, and the production cost is reduced.

DETAILED DESCRIPTION OF PREFERRED EMBODIMENTS

For the purpose, technical solutions and advantages of the present invention will become clear and unambiguous, the embodiment of the present invention is described in further detail below with reference to the accompanying drawings, simultaneously. It should be noted that the specific embodiments described herein are merely for explaining the present invention and are not intended to limit the present invention.

Figure 1:
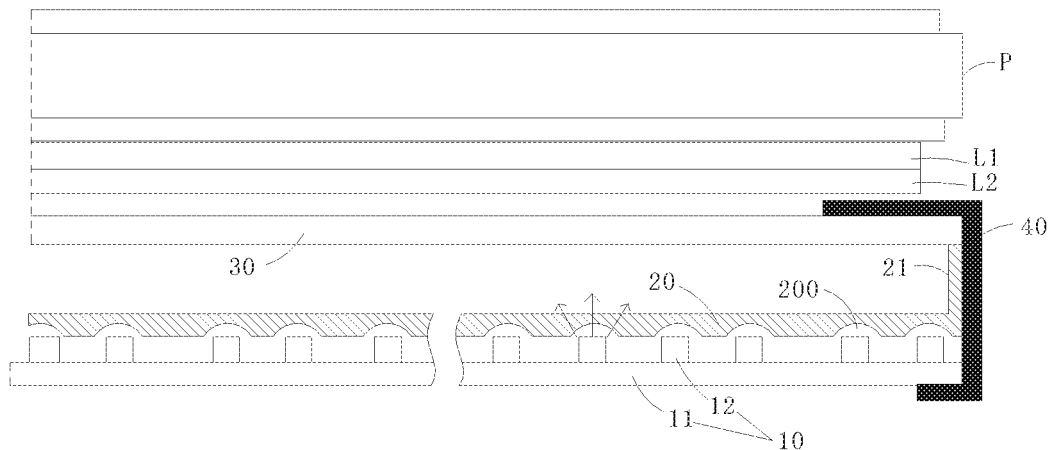
FIG. 1 is a structure diagram of a display device according to the embodiment of the present invention.

Please refer to FIG. 1. The mini light emitting diode (LED) backlight module comprises a light emitting diode (LED) light source 10 and a fluorescent film layer 20. The LED light source 10 comprises a substrate 11 and a plurality of mini LED lamp beads 12 arranged in an array on the substrate 11. Since the mini LED with a size of about 100 micrometers does not need to overcome the threshold of a huge amount of transfer, the mass production is feasible. The mini LED can be applied to a backlight (such as a television) of a large-size display screen, or can be applied to a backlight application of a small-size display screen (such as a mobile phone). The fluorescent film layer 20 is disposed in a light emitting direction of the LED light source 10, and a surface of the fluorescent film layer 20 toward the mini LED lamp beads 12 is provided with grooves 200 arranged in an array.

Figure 2:
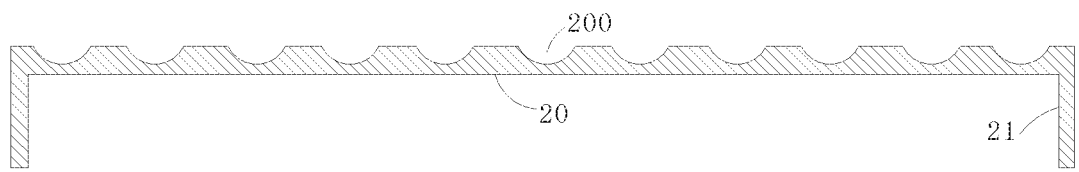
FIG. 2 is a structure diagram of one fluorescent film layer according to the embodiment of the present invention.

As shown in FIG. 2, the bottom surface of the groove 200 of the embodiment is a concave arc surface. For instance, only the bottom surface of the groove 200 is a concave arc surface, or a section of the groove is a concave arc surface. It can be understood that in other embodiments, the groove 200 can also have other shapes, such as, a tapered section, as long as a better promotion can be achieved for the uniformity of light emission of the mini LED lamp beads 12.

Specifically, a number of the grooves 200 is not less than a number of the mini LED lamp beads 12, and each of the mini LED lamp beads 12 is directly opposite to at least one of the grooves 200. As shown in FIG. 1 and FIG. 2, which shows a condition that a number of grooves 200 is equal to a number of mini LED lamp beads 12, each mini LED lamp bead 12 is directly opposite to one groove 200, and a radial dimension of the groove 200 is not less than a radial dimension of the mini LED lamp bead 12, which is directly opposite thereto. Furthermore, the radial dimension of the groove 200 is greater than the radial dimension of the mini LED lamp bead 12, which is directly opposite thereto. The mini LED lamp bead 12 is partially embedded into the groove 200, which is directly opposite thereto, so that most of the light emitted from the mini LED lamp bead 12 is processed by the groove 200 and then enters the fluorescent film layer 20. The divergence is better. The light emission is more uniform, Meanwhile, the thickness of direct type backlight source can be reduced.

Figure 3:
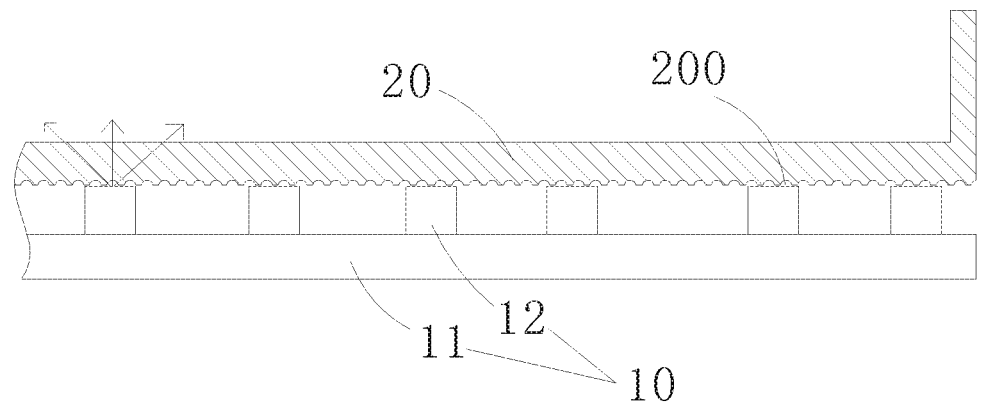
FIG. 3 is a diagram of an application state of another fluorescent film layer according to the embodiment of the present invention.

As shown in FIG. 3, which shows a condition that a radial dimension of the groove 200 is less than a radial dimension of the mini LED lamp bead 12, which is directly opposite thereto, Each mini LED lamp bead 12 is directly opposite to a plurality of grooves 200. The light emitted from one mini LED lamp bead 12 is respectively processed by the plurality of micro groove 200 and then enters the fluorescent film layer 20. The light in the entire region of the fluorescent film layer 20 is almost uniform, and the light uniformity is better.

In addition to comprising grooves 200, the fluorescent film layer 20 further comprises convex pillars 21 arranged along edges of the fluorescent film layer 20 in a circle at intervals, and the convex pillars 21 and the grooves 200 are respectively disposed on two opposite surfaces of the fluorescent film layer 20. The convex pillars 21 enclose the grooves 200 therein. Besides, the mini LED backlight module further comprises a diffusion film 30 and a light shielding adhesive 40, and edges of a bottom surface of the diffusion film 30 are attached to surfaces of the convex pillars 21, and the diffusion film 30 is fixed by the convex pillars 21 around the fluorescent film layer 20. Meanwhile, the light shielding adhesive 40 is adhered on edges of a top surface of the diffusion film 30, and is extended to be adhered to lateral sides of the convex pillars 21 and a bottom surface of the substrate 11 to avoid the light leakage from the edges and the lateral sides of the backlight module.

In order to realize the alignment of the fluorescent film layer 20 and the LED light source 10, an alignment mark is formed on the edge of the substrate 11 of the LED light source 10. When the fluorescent film layer 20 is assembled, the outline of the fluorescent film layer 20 can be aligned with the alignment mark, and then the diffusion film 30 is fixed on the fluorescent film layer 20 with the light shielding adhesive 40.

As shown in FIG. 1, the backlight module can further comprise an upper optical enhancement sheet L1 and a lower optical enhancement sheet L2. The upper optical enhancement sheet L1 and the lower optical enhancement sheet L2 are disposed in front of the diffusion film 30 from top to bottom in sequence. The lower optical enhancement sheet L2 and the diffusion film 30 sandwich the light shielding adhesive 40 therebetween, After the backlight module is assembled with the display panel P, the display panel P is located in front of the upper optical enhancement sheet L1, and the light emitted from the mini LED light lamp bead 12 passes through the fluorescent film layer 20, the lower optical enhancement sheet L2 and the upper optical enhancement film L1 in sequence and enters the bottom of the display panel P to provide the backlight source for the display panel P.

Figure 4:
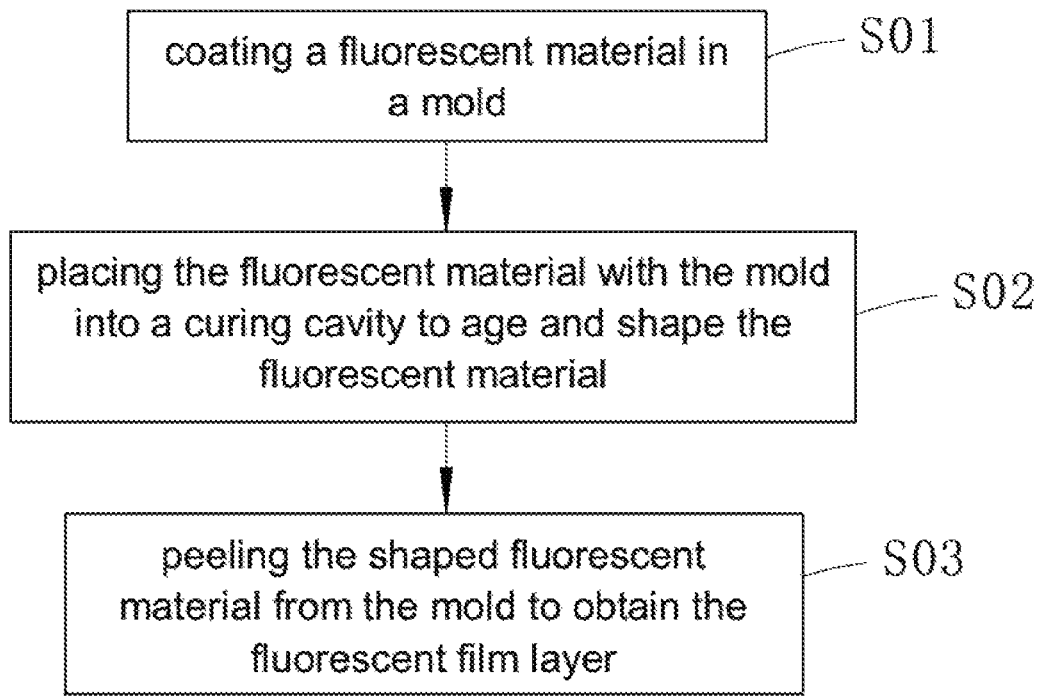
FIG. 4 is a diagram showing a manufacturing method of a fluorescent film layer according to the embodiment of the present invention.
Figure 5:
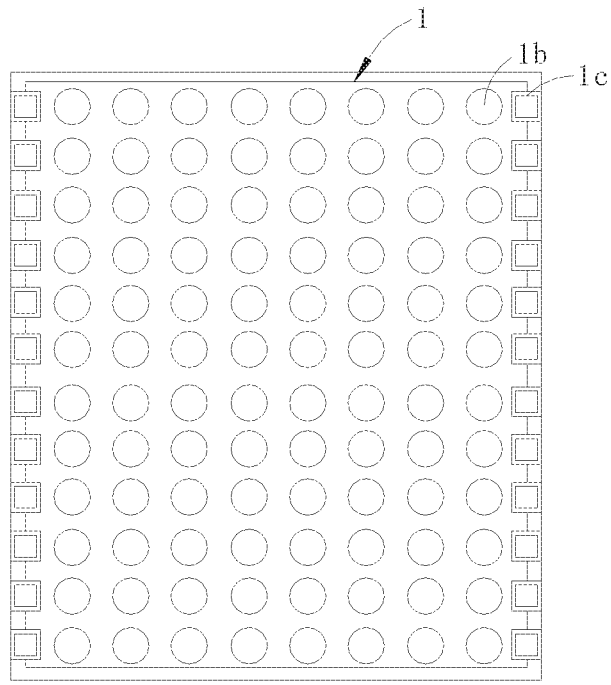
FIG. 5 is a top view structure diagram of a mold according to the embodiment of the present invention.
Figure 6:
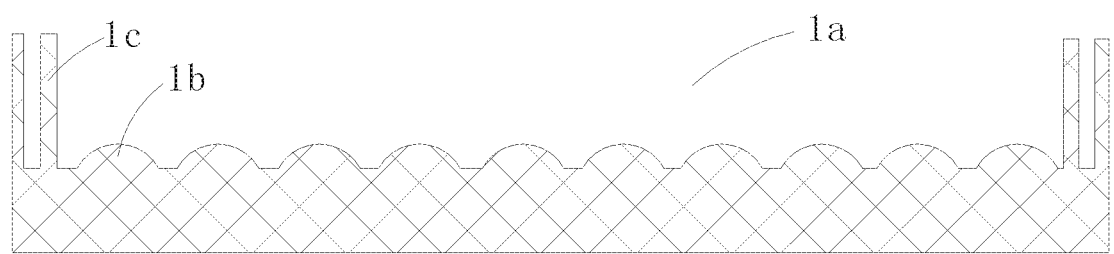
FIG. 6 is a sectional diagram of a mold according to the embodiment of the present invention.

As shown in FIG. 4, the present invention further provides a manufacturing method of a fluorescent film layer, mainly comprising:

S01, coating a fluorescent material in a mold 1. As shown in FIG. 5 and FIG. 6, the mold 1 comprises a cavity 1*a* surrounded by a bottom wall and a sidewall, and the bottom wall is provided with a plurality of protrusions 1*b* arranged in an array, wherein he mold 1 further comprises cylinder portions 1*c* in a circle disposed at an outer edge of the bottom wall, and the fluorescent material is also filled in the cylinder portions 1c as coating the fluorescent material in the cavity 1a and covering all the protrusions 1b;

S02, placing the fluorescent material with the mold into a curing cavity to age and shape the fluorescent material, wherein a temperature in the curing cavity is 60 degrees Celsius to 90 degrees Celsius to simultaneously age the fluorescent material at the bottom wall of the mold 1 and the fluorescent material in the cylinder portions 1c;

S03, peeling the shaped fluorescent material from the mold to obtain the fluorescent film layer 20 with a surface having grooves 200 arranged in an array. Meanwhile, the periphery of the grooves 200 is further formed with convex pillars 21 in a circle, which can be used to support and fix the diffusion film 30. wherein the cross-section of the cylinder portions 1c is rectangular, and the finally convex pillars 21 are rectangular, correspondingly. The reliable support can be achieved, and the attachment and fixation of the light shielding adhesive 40 can also be facilitated.

By designing the fluorescent film layer having a specific shape, and placing the same in front of the mini light emitting diode lamp beads in the present invention, the light leakage can be avoided and the light path can be changed to solve the problem of hotspot and light leakage around in the mini light emitting diode backlight module. The method is simple and easy, and the production cost is reduced. The backlight module of the present invention can also realize the compactness and thinness of the structure, and can utilize the simple structure to achieve the side light leakage.

Above are only specific embodiments of the present application, the scope of the present application is not limited to this, and to any persons who are skilled in the art, change or replacement which is easily derived should be covered by the protected scope of the application. Thus, the protected scope of the application should go by the subject claims.

What is claimed is:

1. A mini light emitting diode backlight module, comprising a light emitting diode light source and a fluorescent film layer, wherein the light emitting diode light source comprises a substrate and mini light emitting diode lamp beads arranged in an array on the substrate, and the fluorescent film layer is disposed in a light emitting direction of the light emitting diode light source, and a surface of the fluorescent film layer toward the mini light emitting diode lamp beads is provided with grooves arranged in an array; wherein a bottom surface of the groove is a concave arc surface, and the fluorescent film layer further comprises convex pillars arranged along edges of the fluorescent film layer in a circle at intervals, and the convex pillars and the grooves are respectively disposed on two opposite surfaces of the fluorescent film layer.

2. The mini light emitting diode backlight module according to claim 1, further comprising a diffusion film, wherein edges of a bottom surface of the diffusion film are attached to surfaces of the convex pillars.

3. The mini light emitting diode backlight module according to claim 2, further comprising a light shielding adhesive, wherein the light shielding adhesive is adhered on edges of a top surface of the diffusion film, and is extended to be adhered to lateral sides of the convex pillars and a bottom surface of the substrate.

4. The mini light emitting diode backlight module according to claim 1, wherein a number of the grooves is not less than a number of the mini light emitting diode lamp beads, and each of the mini light emitting diode lamp beads is directly opposite to at least one of the grooves.

5. The mini light emitting diode backlight module according to claim 4, wherein a bottom surface of the groove is a concave arc surface.

6. The mini light emitting diode backlight module according to claim 5, wherein the fluorescent film layer further comprises convex pillars arranged along edges of the fluorescent film layer in a circle at intervals, and the convex pillars and the grooves are respectively disposed on two opposite surfaces of the fluorescent film layer.

7. The mini light emitting diode backlight module according to claim 6, further comprising a diffusion film, wherein edges of a bottom surface of the diffusion film are attached to surfaces of the convex pillars.

8. The mini light emitting diode backlight module according to claim 7, further comprising a light shielding adhesive, wherein the light shielding adhesive is adhered on edges of a top surface of the diffusion film, and is extended to be adhered to lateral sides of the convex pillars and a bottom surface of the substrate.

9. The mini light emitting diode backlight module according to claim 4, wherein a radial dimension of the groove is not less than a radial dimension of the mini light emitting diode lamp bead, which is directly opposite thereto, and each of the mini light emitting diode bead faces one of the grooves.

10. The mini light emitting diode backlight module according to claim 9, wherein a bottom surface of the groove is a concave arc surface.

11. The mini light emitting diode backlight module according to claim 10, wherein the fluorescent film layer further comprises convex pillars arranged along edges of the fluorescent film layer in a circle at intervals, and the convex pillars and the grooves are respectively disposed on two opposite surfaces of the fluorescent film layer.

12. The mini light emitting diode backlight module according to claim 11, further comprising a diffusion film, wherein edges of a bottom surface of the diffusion film are attached to surfaces of the convex pillars.

13. The mini light emitting diode backlight module according to claim 12, further comprising a light shielding adhesive, wherein the light shielding adhesive is adhered on edges of a top surface of the diffusion film, and is extended to be adhered to lateral sides of the convex pillars and a bottom surface of the substrate.

14. The mini light emitting diode backlight module according to claim 9, further comprising a diffusion film and a light shielding adhesive, wherein a bottom surface of the groove is a concave arc surface, and the fluorescent film layer further comprises convex pillars arranged along edges of the fluorescent film layer in a circle at intervals, and the convex pillars and the grooves are respectively disposed on two opposite surfaces of the fluorescent film layer, and edges of a bottom surface of the diffusion film are attached to surfaces of the convex pillars, and the light shielding adhesive is adhered on edges of a top surface of the diffusion film, and is extended to be adhered to lateral sides of the convex pillars and a bottom surface of the substrate.

15. A manufacturing method of a fluorescent film layer, comprising:
    coating a fluorescent material in a mold, wherein the mold comprises a cavity surrounded by a bottom wall and a sidewall, and the bottom wall is provided with a plurality of protrusions arranged in an array;
    placing the fluorescent material with the mold into a curing cavity to age and shape the fluorescent material;
    peeling the shaped fluorescent material from the mold to obtain the fluorescent film layer with a surface having grooves arranged in an array; wherein the mold further comprises cylinder portions in a circle disposed at an outer edge of the bottom wall, and the fluorescent material is also filled in the cylinder portions as coating the fluorescent material in the mold.

16. The manufacturing method of the fluorescent film layer according to claim 15, wherein a temperature in the curing cavity is 60 degrees Celsius to 90 degrees Celsius.

* * * * *